Dec. 14, 1926. 1,611,147
A. C. HOPKINS
REENFORCING ELEMENT FOR PNEUMATIC TIRE BEADS
Filed April 9, 1926

INVENTOR
Arthur C. Hopkins
BY
ATTORNEY

Patented Dec. 14, 1926.

1,611,147

UNITED STATES PATENT OFFICE.

ARTHUR C. HOPKINS, OF NILES, MICHIGAN, ASSIGNOR TO NATIONAL-STANDARD COMPANY, OF NILES, MICHIGAN.

REENFORCING ELEMENT FOR PNEUMATIC-TIRE BEADS.

Application filed April 9, 1926. Serial No. 100,830.

My present invention is an improvement upon and an adaptation of the invention of my application for Letters Patent filed August 3, 1925, Serial No. 47,859.

The main objects of the invention are:

First, to provide an improved reenforcing element which is substantially non-extensible either laterally or longitudinally and is of great tensile strength.

Second, to provide an improved reenforcing element which is capable of being manufactured by machinery at a high rate of speed.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which.

Figure 3:
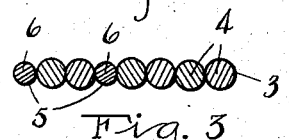
Figure 4:
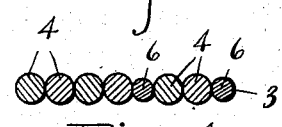
Figure 5:
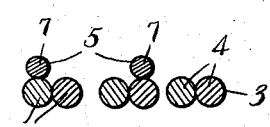
Figure 2:
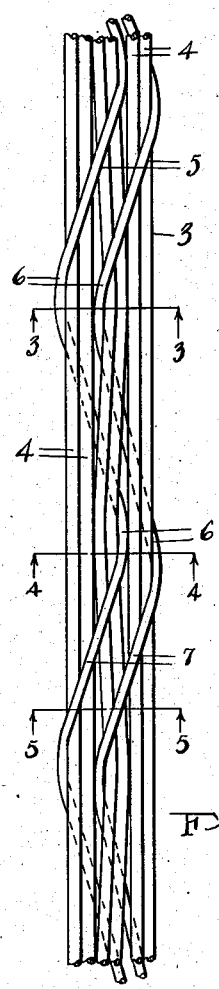
Fig. 2 is a fragmentary view of my improved reenforcing element.

Figs. 3, 4, and 5 are transverse sections taken on lines 3—3, 4—4, and 5—5, respectively, of Fig. 2, illustrating the relation of the bonding strands to the other strands.

Figure 1:
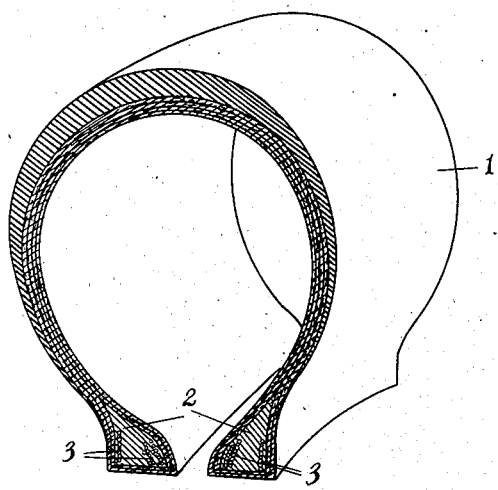
Fig. 1 is a fragmentary view of a tire embodying beads with my improved reenforcing element embedded therein.

In Fig. 1 the tire casing 1 is shown conventionally and is provided with beads 2 having reenforcing elements designated generally by the numeral 3 embedded therein. These may be arranged as desired but they are usually arranged in the form of a plurality of wraps, three being illustrated.

The reenforcing element comprises a plurality of strands 4 arranged in groups, there being two strands in each group in the embodiment illustrated. These strands are bonded together and maintained in proper relation by means of the bonding strands 5. The bonding strands are spirally wrapped around adjacent groups of the longitudinal strands, the bights 6 of the bonding strands coinciding, which results in a series of loops successively engaging or wrapped around the adjacent groups of strands. The reaches 7 of these loops are of substantial length and lie in superimposed contact with the longitudinal strands which they cross.

The groups of strands are uniformly and successively bonded together with little distortion thereof and a minimum distortion of the bonding strands. The result is that the bonding strands and the longitudinal strands lie in edge to edge contact at the bights of the loops and the bonding strands lie in superimposed contact substantially throughout their reaches. There is no slack to be taken up when stress is applied and the element is substantially non-stretchable both longitudinally and transversely. This is of further advantage in that the strands do not materially change their position when under stress so that the bonding of the bead composition is not likely to be broken.

Having thus described my invention what I claim as new and desire to secure by Letters Patent is:

1. A tire bead reenforcing element comprising a plurality of longitudinal wire strands arranged in pairs, and a plurality of bonding strands successively looped around the adjacent pairs with coinciding loops, the reaches of the loops being of substantial length and being in superimposed contact with the longitudinal strands embraced thereby.

2. An element of the class described comprising a plurality of groups of longitudinal wire strands, and a plurality of bonding strands successively and alternately looped around adjacent groups of longitudinal strands so that such adjacent groups are engaged by alternate loops of the bonding strands and the groups are uniformly and successively bonded together.

In witness whereof I have hereunto set my hand.

ARTHUR C. HOPKINS.